March 13, 1962  D. R. HOUGH  3,024,827

VEHICLE TIRE CONSTRUCTION AND METHOD OF MAKING SAME

Filed Oct. 21, 1960

INVENTOR.
Dean R. Hough
BY
his ATTORNEY 3,024,827
VEHICLE TIRE CONSTRUCTION AND METHOD OF MAKING SAME
Dean R. Hough, Pittsburgh, Pa., assignor to Washington Rubber Company, Washington, Pa.
Filed Oct. 21, 1960, Ser. No. 64,131
3 Claims. (Cl. 152—330)

This invention relates generally to a vehicle tire construction and the method of making such tire and, more particularly, relates to a tire which is capped or recapped in a manner so as to make it completely devoid of air pockets between the casing and tread rubber.

Vehicle tires, when worn, are generally retreaded by first buffing the tire and thereafter applying a tread layer of rubber, often times a winter tread, so as to increase the life of the tire casing.

The most serious problem arising from retreaded tires, and which has plagued the tire recapping industry for years, is that of the great tendency of separation of the retread rubber from the casing. This is a very dangerous situation which will generally result in abnormal wear and blow outs.

I have made the discovery that the main reason for such separation is the tendency of very small air pockets to form between the casing and the tread rubber during the recapping process. Such pockets are not detected by present known methods except by cutting the tire which, of course, is a destructive and impractical way of testing for such pockets.

During the curing and retreading process, an air bag is applied internally of a mold and is filled with air under pressure of perhaps about 135 lbs. per square inch so as to force the casing against a layer of tread rubber or camelback and it, in turn, presses against the tread mold which forms the tread design. In this process, air tends to become trapped in the form of little pockets between the casing and tread rubber. While the pressure of the air bag forces some of the air pockets away, particularly from the central outer peripheral portion of the tire casing, they nevertheless tend to form, particularly in the shoulder portion of the tire. These air pockets are very objectionable and considerably reduce the life of the tire. That is, when the retreaded tire is in use on a vehicle and becomes heated as the result of friction caused by rotation of the tires on the road, particularly on a hot summer day, these air pockets expand considerably in volume, and as they become larger they will eventually effect separation of one or more portions of the tread rubber from the casing. Such separation results either in the form of slight bulges of the tread which soon wear, or in complete stripping or separation of the tread rubber. This, of course, not only considerably shortens the life of the retreaded tire but causes blow-outs and resultant serious accidents, many of which are fatal.

This problem has been a very vexing and perplexing one for years in the rubber industry, particularly in the rubber retreading industry and many attempts have been made to solve the problem but none of these attempts has been successful. For example, attempts have been made to bleed air pockets by inserting needles through the sidewalls of the tire in a hit or miss fashion in the hopes of piercing such unseen pockets, however, such holes would soon plug up during the curing and retreading process and would be ineffective to relieve air from such pockets. Other attempts have been made involving stitching or rolling of the tread to the casing, but these have not been successful in eliminating air pockets.

An object of the present invention is to provide a tire construction and method of recapping or applying tread rubber to a casing which will completely eliminate the formation of air pockets between the casing and tread rubber by expelling such air during the treading or retreading process so as to overcome all the above mentioned difficulties resulting from conventional capping or recapping methods, such as the greatly shortened life of the tire and the danger of blow-outs resulting from tread separation.

A further object of the invention is to provide a novel tire construction and method suitable for either retreaded tires or new tires, and particularly tubeless tires, and which will provide an escape path for air pockets that may develop between the casing and tread rubber either as the result of the recapping process or which may develop later on during use of the tire as the result of punctures or the development of other imperfections which may cause seepage of air between the tread layer and the casing.

Other objects and advantages will become more apparent from a study of the following description taken with the accompanying drawing wherein.

Figure 1:
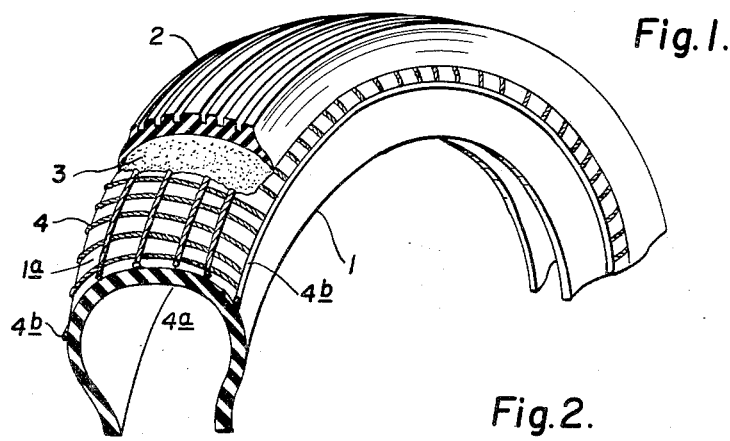
FIGURE 1 is a perspective view of a vehicle tire, the tread layer being shown partly cut-away, from the casing to better illustrate the intermediate cord layer 4 embodying the principles of the present invention.
Figure 2:
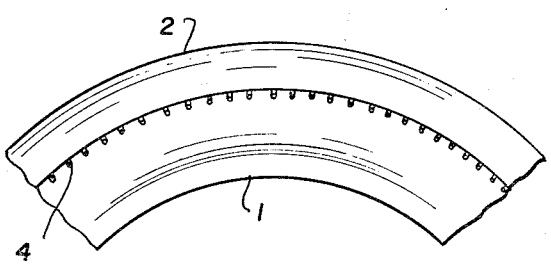
FIGURE 2 shows a portion of the tire of FIG. 1 after it has been completed and after the ends of the cord layer are cut flush with the sidewalls.
Figure 3:
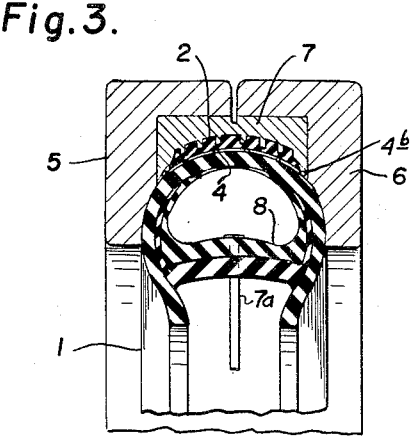
FIGURE 3 is a cross sectional view taken through the recapping mold.

Referring more particularly to FIGURE 1 of the drawing, numeral 1 denotes a vehicle tire casing which is provided with a tread layer 2 which is normally adhered to the casing, particularly in the case of a retreaded tire, by first buffing the casing to provide a rough surface, as shown at 1a, and thereafter interposing a very thin layer of cushion gum 3 between the roughened surface and the tread layer 2, and then inserting this assembly inside a mold, such as shown in FIG. 3, which comprises mold parts 5 and 6, a tread design forming mold 7 and a tube or air bag 8 into which air is introduced through stem 7a so as to create a pressure in the bag of the order of 135 lbs. per square inch to force the casing against the tread rubber which, in turn, is forced against the tread impression in mold 7.

In accordance with my invention I provide an annular net or layer 4 of ordinary twine or rope, preferably, parcel post cord with a plurality of strands running circumferentially and a plurality of strands extending transversely directly on the roughened surface of the buffed casing. The longitudinal and lateral strands may be either separate strands or woven together. I have made the amazing discovery that strands of ordinary parcel post cord or similar cord when sandwiched as an intermediate layer between the casing and tread layer, that is, underneath cushion gum layer 3, will conduct air by capillary action as the result of air pressure of the recapping process so that if there is any tendency of air pockets to form between the casing and tread layer, the air will be forced out through leakage paths along the lengths of the fibers of cord layer 4 and will thus be forced completely out of the tire by leading the strands laterally through and beyond the sidewalls of the tire, as shown. Therefore, even when the bag air pressure is less than normal pressures, for example, when only 100 lbs. per square inch instead of the normal 135 lbs. per square inch, this is nevertheless sufficient pressure to effect not only a tread design impression but to force out any air which tends to form into pockets between the casing and the tread rubber and to expel such air through the strands of cord 4 which extend through the tire sidewalls. Trapped air in the openings of the mesh will be forced to the nearest strand. The portions of cord 4 projecting from the sidewalls are then cut flush with the sidewalls of the tire and will be visible from the outside thereof, although without marring the appearance or the attractiveness of the finished tire. This exposure of the ends of cord 4 at the sidewalls has a further outstanding advantage. For example, if the air somehow becomes trapped between the casing and tread, such as by a puncturing nail or by leakage through the inner surface of the casing and some air pockets do form between the tread and the casing, during use of the tire, then as the result of heat and expansion of air in the pockets, the air will leak out along the fibers and will be expelled through the sidewalls. Thus the annular net of cord 4 has a dual function of preventing occurrence of air pockets during the recapping process and of relieving air from any air pockets that may be introduced as the result of use or wear of the tire.

It will be readily apparent to those skilled in the art that my invention may be practiced by other embodiments. For example, the net openings at the center of cord layer 4 may be made larger than those along the sides adjacent the shoulder because of the greater concentration of air pockets at the shoulders. Also cord 4 may be made of any suitable fibrous material, such as hemp or even plastic fibers, such as rayon.

Cord network 4 may be sandwiched between the cushion gum 3 and usual polyethylene removable strip (not shown) as a component part of the tread stock or camelback for convenient use by recappers.

Moreover, in order to permit the annular net 4 to fit different tire sizes the outer annular strand 4b may be made of elastic material and net 4 may be woven to expand somewhat like a hair net. Or the strands of alternate transverse courses, or groups of courses, may be twisted oppositely to form a herringbone pattern which will yield in a circumferential direction such as in the knitting of women's stretch nylon stockings.

Or perhaps instead of a net of cord 4, an open weave cloth layer may be used instead, or perhaps tubular strands of porous or perforated material, such as plastic material. Other patterns than the rectangular netting may be used, such as a diamond pattern. The important requirement is that there be a lateral escape path through the shoulder portion and through the sidewall of the tire to expel trapped air. In fact, the strands may be confined to the shoulder portions only in some instances.

A modification of the invention would be to buff the worn tire down to the cord layers, then to connect these layers with cord strands which project through the sidewalls, thereby allowing the conventional cord layers to serve as air leakage paths.

The annular cord net 4 may be placed underneath the cushion gum and in some instances may be placed between such cushion gum and tread layer, or perhaps both above and below the cushion gum in the form of two layers or nets.

The presence of net 4 against the thin cushion gum layer will prevent abnormal distribution of the cushion gum layer and the build-up of concentrations thereof as the result of air pockets, which detract from the adhesive characteristics of the cushion gum layer since such material is a good adhesive but does not have the body strength of the tread layer. In short, cord 4 provides uniform distribution thereof.

Since lower than ordinary pressures will suffice in the air bag, there will be less tendency for air leak in the mold.

It should be noted that the present method is useful for applying the tread layer on new tires as well as for recapped tires for vehicles, trucks and other vehicles.

Thus it will be seen that I have provided an efficient and inexpensive construction and method of recapping or capping tread layers on vehicle tires which will eliminate the tendency to form air pockets between the casing and tread layer as the result of molding and which will relieve and expel any air pockets formed as a consequence of use of the tire, thus preventing the main cause for separation of the tread layer and consequent abnormal wear and blowouts, thereby increasing the life of a recapped tire by many fold. But more important than this, the present invention, by preventing separation of either the tread rubber or sidewall, which usually results in subsequent blowout of the casing, will prevent many serious accidents and will actually save many lives, since a very large percentage of deaths resulting from vehicle accidents are caused by blowouts which are initiated by tread rubber or sidewall separation.

Figure 4:
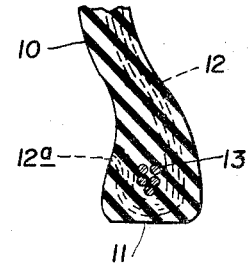
FIGURE 4 is a fragmentary section of a new tire bead.

Furthermore, my invention is not only suitable for retreading tires with either summer or winter tread, but is useful in new tire construction as well. A suitable manner of applying a leakage path for air in a new tire is shown in FIG. 4 showing only the bead portion of a new tire wherein the conventional 4 plies 12 which are usually wrapped around the bead wires 13 and embedded, will, instead, have their terminal ends 12a led out through the sidewalls. Thus the conventional plies 12 themselves inherently act as passages for relieving air pockets. In some instances, only one ply, such as the one nearest the surface of the bead heel may be led through the sidewall. Thus any air pockets tending to form along any of the plies, even at the tread base, will be conducted along the entire length of the plies, that is, down along the inside of the sidewalls and finally will be expelled through ends 12a. I have found that air will travel through very long paths along cords inside the rubber, even along the entire circumference.

Furthermore, the present invention, by relieving heated air pockets and by virtue of alternate compression and relaxation of the cords as a consequence of tire movement during rotation, will apparently alternately suck in and then expel air, thereby keeping the tire much cooler than normal, thus prolonging the life of the tire and further preventing blowouts. Of course, any other means for providing an escape path for air may be used instead so long as it does not plug up as occurs with ordinary holes through the rubber.

While I have illustrated and described several embodiments of my invention, it will be understood that these are by way of illustration only, and that various changes and modifications may be made within the contemplation of my invention and within the scope of the following claims.

I claim:

1. A vehicle tire comprising a casing having cord layers, a network of cord of large mesh covering said casing and spaced from said cord layers, and a layer of tread rubber covering said network, said network projecting through the sidewalls of the tire at the base of said tread rubber and comprising air conducting fibers for providing an escape path through the sidewalls for air trapped in pockets formed between said casing and tread rubber.

2. For use in recapping a casing of a worn vehicle tire, having sidewalls, with a tread rubber layer, a net of cord adapted to extend across the width and along the entire circumference of the worn tread surface of the casing, and comprising intersecting cords of fibrous material forming large mesh openings adapted to provide escape paths along the cords for air otherwise entrapped between said worn tread surface and tread rubber layer, said net having side strands of elastic material adapted to engage the sidewalls of the tire during recapping for holding said net in place between the tire casing and tread rubber layer during recapping with cord portions extending laterally along said worn tread surface and projecting through the sidewalls.

3. The construction recited in claim 2, wherein said casing has cord layers and wherein said net of cord comprises a plurality of strands running circumferentially and a plurality of strands running transversely along the worn tread surface of the casing spaced from and overhanging the cord layers of the tire casing, and having mesh openings of the order of four meshes extending transversely of the entire worn tread surface of said casing.

References Cited in the file of this patent

UNITED STATES PATENTS

| | | |
|---|---|---|
| 1,193,715 | Price | Aug. 8, 1916 |
| 2,007,825 | Day | July 9, 1935 |
| 2,027,248 | Reel | Jan. 7, 1936 |
| 2,542,871 | Johnson | Feb. 20, 1951 |
| 2,689,200 | Johnson | Sept. 14, 1954 |
| 2,774,409 | Skidmore | Dec. 18, 1956 |